May 22, 1945.                    B. C. NELSON                    2,376,500
                    MACHINE FOR TREATING SKINS AND THE LIKE
                    Filed July 18, 1942           3 Sheets-Sheet 1
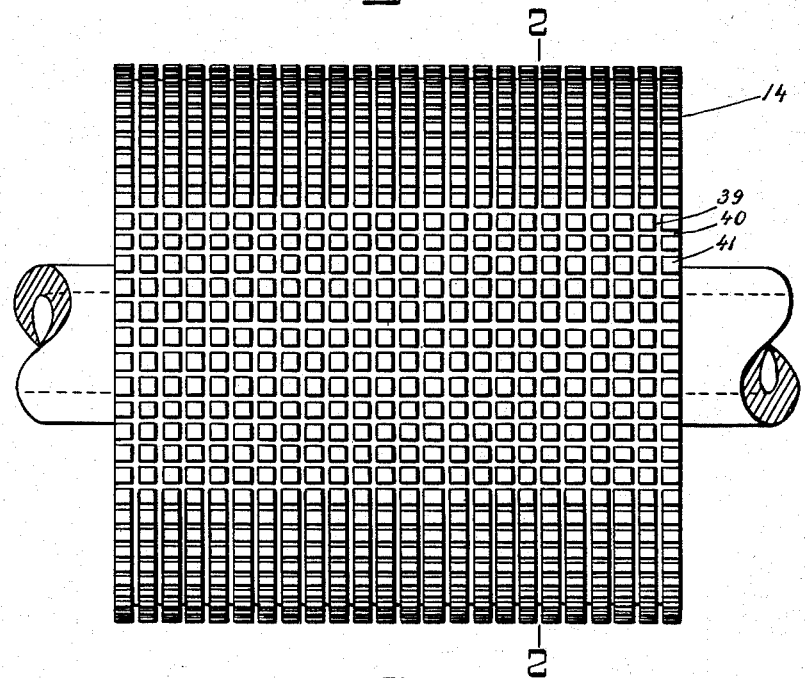
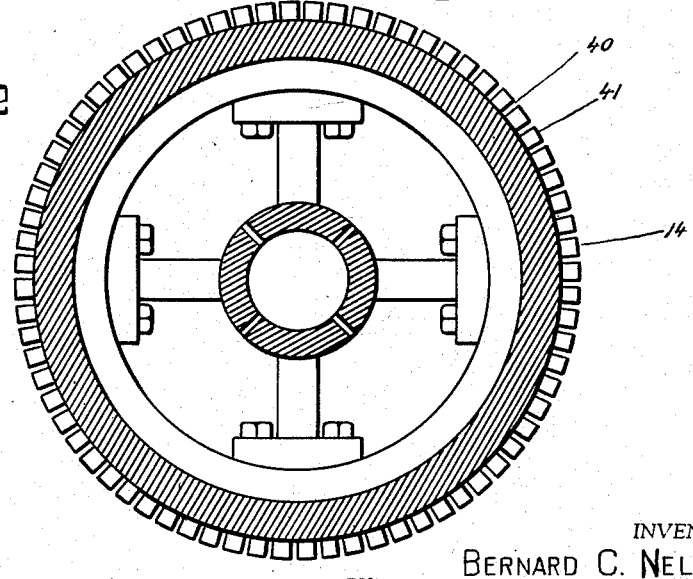
INVENTOR.
BERNARD C. NELSON
BY
ATTORNEY.

May 22, 1945.       B. C. NELSON       2,376,500
MACHINE FOR TREATING SKINS AND THE LIKE
Filed July 18, 1942         3 Sheets-Sheet 2
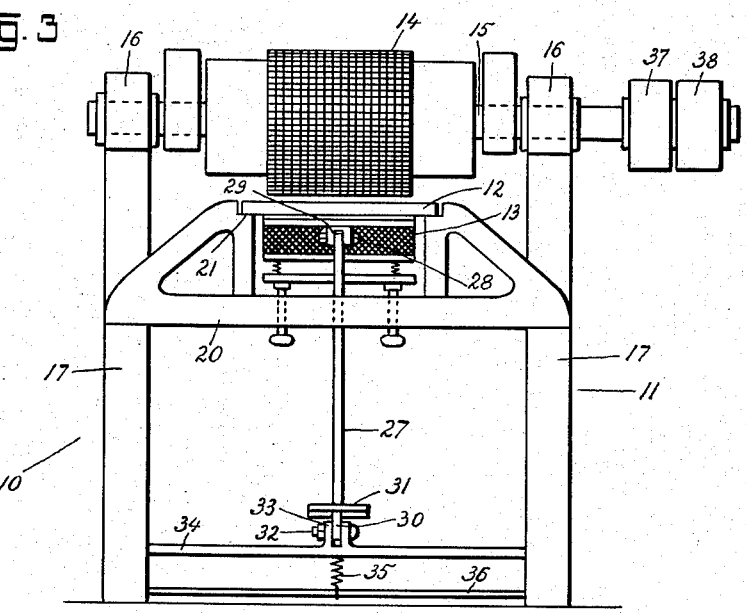
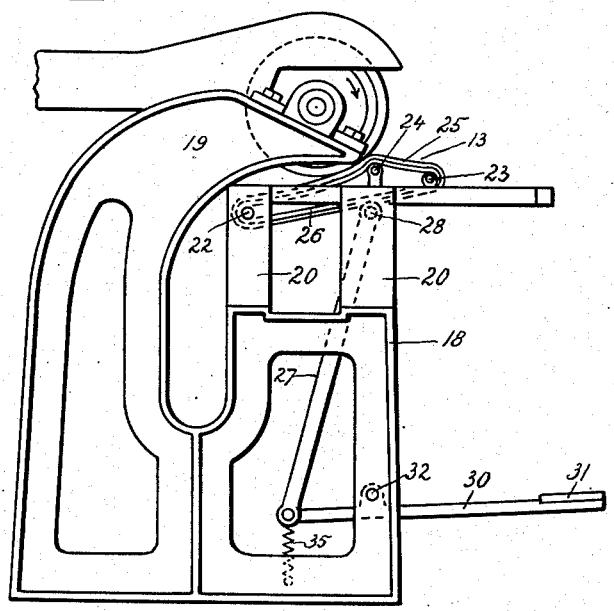
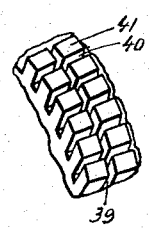
INVENTOR.
BERNARD C. NELSON
BY Irving Seidman
ATTORNEY.

May 22, 1945.　　　B. C. NELSON　　　2,376,500
MACHINE FOR TREATING SKINS AND THE LIKE
Filed July 18, 1942　　　3 Sheets-Sheet 3
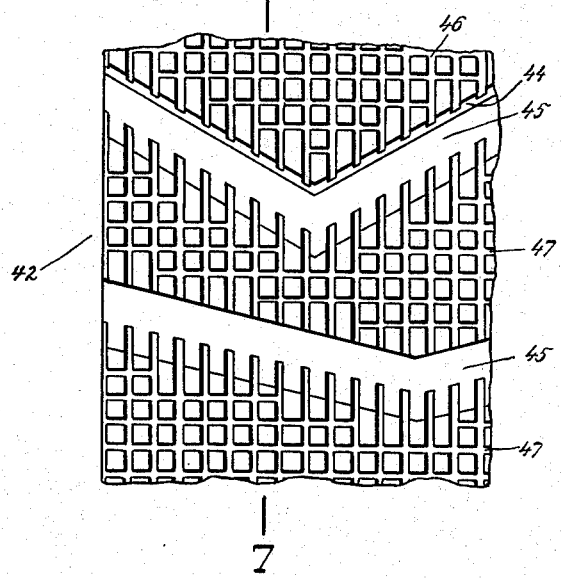
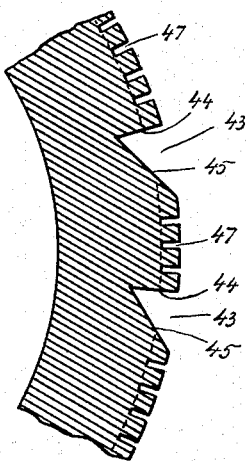
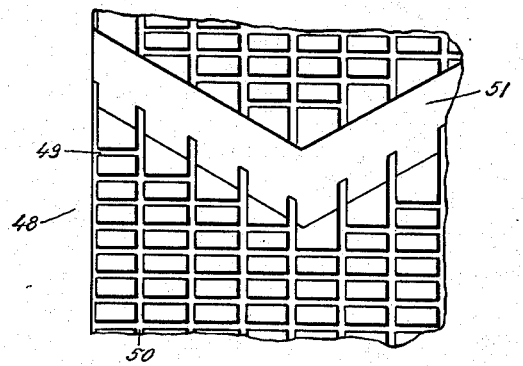
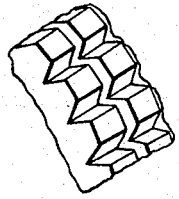
INVENTOR.
BERNARD C. NELSON
BY Irving Seidman
ATTORNEY.

Patented May 22, 1945

2,376,500

UNITED STATES PATENT OFFICE 2,376,500

MACHINE FOR TREATING SKINS AND THE LIKE

Bernard C. Nelson, Needham, Mass.

Application July 18, 1942, Serial No. 451,461

3 Claims. (Cl. 69—27)

This invention relates to machines, for treating skins, and particularly to drums used for same.

Broadly, it is an object of my invention to provide a drum for a machine, for treating skins which will produce a smoother and better skin, at the same time give the hairs an improved luster.

A further object of my invention is to provide a drum for treating skins with grooves which will cause the heat to be distributed evenly on the hairs of the skin to produce a better skin.

A further object of my invention is to provide a drum for a machine for treating skins so that the uniform heat provided by the drum will prevent the hairs of the skin from being singed.

Heretofore, drums have been used in connection with machines for treating skins which have a multiplicity of pins which in time become worn and have to be replaced. Such repairs slows production and is costly. With my new type of drum such wearing parts are reduced to a minimum and production will not be stopped because of necessary repairs to the drum.

With the above and other objects in view, the invention will be hereinafter more particularly described, and the combination and arrangements of parts will be shown in the accompanying drawings and pointed out in the claims which form a part of this specification.

Reference will now be had to the drawings, wherein like numerals of reference designate corresponding parts throughout the several views, in which:

Figure 1 is front elevational view of my ironing and stretching drum, showing the shaft broken away.

Figure 2 is a section taken through line 2—2 of Figure 1.

Figure 3 is a front elevational view of a skin treating machine showing the roller of Figure 1 in position.

Figure 4 is a side elevation of the machine shown in Figure 1.

Figure 5 is an enlarged fragmentary perspective view of the drum shown in Figure 1.

Figure 6 is a view of a fragmentary portion of the cylindrical surface of a modified ironing and stretching drum developed into a plane.

Figure 7 is a section taken through line 7—7 of Figure 6.

Figure 8 is a view of a fragmentary portion of the cylindrical surface of another modified ironing and stretching drum developed into a plane.

Figure 9 is an enlarged fragmentary perspective view of a modified roller having V shaped grooves.

Referring to the drawings, numeral 10 indicates a machine for treating skins and the like, comprising a frame 11 having a table 12 in which a blanket 13 is mounted, movable vertically.

An ironing drum 14, having a hollow shaft 15 is rotatably mounted in bearings 16 above the table 12. The ironing drum 14 can be provided with heating elements for gas or electricity, whichever is most desirable and thermostatic means for automatically controlling the heat.

The frame 11 comprises a pair of parallel side walls 17, 17 which have low front portions 18 and high rear portions 19. A pair of parallel bridge members 20 are mounted across the low portions 18 and connected to the side walls 17, 17 in unitary relation. The bridge members 20 have inclined sides extending upwardly from the outer faces of the side walls 17, 17, terminating in brackets 21 on which the table 12 has been fixed (not shown).

The rear portion of the table 12 is formed with a large rectangular opening in which the blanket 13 is mounted. A bar 22 extends across the rear of the rectangular opening, bar 23 extends across the front of the central part of table 12 with bar 24, slightly higher than bar 23 and placed between bars 22 and 23, all the bars being parallel to one another. The blanket 13 is rotatably mounted on bars 22, 23 and 24.

The rear portion of blanket 13 is sloped downwardly toward the rear of the machine. The blanket 13 may be made of a sheet felt material, as shown at 25 or a suitable cloth and reinforced and supported by wire mesh belting 26 of the same width as the blanket 13, so that it assists in tautly supporting the blanket 13.

The means for lifting and lowering the blanket 13, comprise a link 27 which is pivotally connected by a pintle 28 to a bracket 29. The link 27 extends downward and rearward and pivotally connects with a lever 30. The front end of the lever 30 terminates in a pedal 31 by means of which the front end of the lever may be depressed.

The lever 30 is pivotally supported intermediate its ends on a pin 32 in lugs 33 extending from a bracket 34. Bracket 34 is secured to the side walls 17, 17 of the frame 11. A spring 35 is connected between the bottom end of the link 27 and a stationary rod 36 on the frame and serves to maintain the blanket 13 in its lowered position. When the pedal 31 is depressed, the blanket 13 will move upwardly into engagement with the drum 14.

As shown in Figure 4, the bearings 16 are secured to the overhanging portions 19 of the frame 11. The outer end of the hollow shaft 15 carries a pair of pulleys 37, 38 for contact with a belt; the pulley 37 being keyed to the hollow shaft and the pulley 38 being freely rotatably mounted on the hollow shaft. The hollow shaft may contain gas and the small openings are gas jets for heating the interior of the roller (see Fig. 2). Any well known belt shifting mechanism may be used for shifting the belt from one pulley to the other. The ironing drum 14 may be covered with a dust and heat shield (not shown) and to prevent the excessive heat (if any) from reaching the skins placed upon the blanket 13.

As shown in Figures 1, 2 and 5, the ironing drum 14 has a series of uniformly spaced paralleled circumferential grooves 39 crossed by paralleled longitudinal grooves 40 creating squares 41 as shown in Figure 5. During the rotation of the drum 14, the air is caused to circulate in grooves 39 and 40 and mix with the air heated by the heating means within the drum so that a more uniform and evenly distributed heat is continually applied to the hairs of a skin upon blanket 13, thus preventing singeing during the raising and stretching of the hairs of the skin being treated. The action of drum 14 will also produce a smoother and better fur.

As shown in Figure 2, the grooves 39 and 40 are cut into the surface of the drum 14 with straight walls so that the section appear rectangular. However, the longitudinal grooves may be V shaped, as shown in Figure 9, or both the longitudinal grooves and the circumferential grooves may be V-shaped (not shown).

As shown in Figures 6 and 7, the modified drum 42 has a plurality of substantially V shaped grooves 43, the apices being positioned in offset relation with the middle of the drum so as to cover the entire circumference of the drum with the grooves. As best seen in Figure 7, the grooves 43 are of triangular cross section, each groove having a radially positioned wall 44 and a wall 45 positioned at an acute angle to the radial wall 44. The surface of the drum 42 has, in addition to the V shaped grooves 43, a series of parallel uniformly spaced circumferential grooves 46 and a series of parallel longitudinal grooves 47, spaced apart the same distance as the circumferential grooves. All these grooves during rotation of the drum 42 serve to circulate the heated air and the outer air within the grooves and to raise and stretch the hairs of a skin while an evenly distributed heat is applied.

Referring to Figure 8, the numeral 48 represents another modified drum very much like the drum shown in Figures 6 and 7, except that the longitudinal grooves 49 are uniformly spaced apart a lesser distance than the circumferential grooves 50; the large V shaped grooves 51 being similar to the V shaped grooves 43 of Figures 6 and 7. Of course, the walls of grooves 49 and 50 may be V shaped, as shown in Figure 9.

I have found that drums constructed like those shown in Figures 1, 6 and 8 will stand an exceptional wear, thus permitting the drum to remain in constant use so that production will not cease for necessary repairs.

It should be understood that the different drums illustrated in the drawings and described in the specification may be designed for application upon all of the well known machines for treating skins of different animals.

It is obvious that various changes and modifications may be made in the details of construction without departing from the general spirit of the invention, as set forth in the appended claims.

I claim:

1. A skin treating machine comprising a circular drum, heating means within said drum, said drum having a series of uniformly spaced parallel straight circumferential grooves crossed by a series of uniformly spaced parallel straight grooves, creating a uniform series of squares upon the outer surface.

2. A skin treating machine comprising a circular drum, heating means within said drum, said drum having a series of uniformly spaced parallel straight circumferential grooves crossed by a series of uniformly spaced parallel straight grooves said last named grooves spaced apart the same distance as said circumferential grooves creating raised squares.

3. A skin treating machine comprising a circular drum, heating means within said drum, said drum having a series of uniformly spaced parallel straight circumferential grooves crossed by a series of uniformly spaced parallel straight grooves, said grooves having sloping walls uniformly spaced around the entire drum.

BERNARD C. NELSON.